(12) United States Patent
Noone et al.

(10) Patent No.: US 6,614,192 B1
(45) Date of Patent: Sep. 2, 2003

(54) ELECTRONIC BALLAST CIRCUIT

(75) Inventors: Sean Noone, County Mayo (IE); Thomas Durkan, County Mayo (IE); Michael Quinlan, County Limerick (IE); Paul McCarthy, County Limerick (IE)

(73) Assignee: Noontek Limited, County Mayo (IE)

( * ) Notice: Subject to any disclaimer, the term of this patent is extended or adjusted under 35 U.S.C. 154(b) by 0 days.

(21) Appl. No.: 09/979,052

(22) PCT Filed: May 17, 2000

(86) PCT No.: PCT/IE00/00067

§ 371 (c)(1),
(2), (4) Date: Apr. 12, 2002

(87) PCT Pub. No.: WO00/70920

PCT Pub. Date: Nov. 23, 2000

(30) Foreign Application Priority Data

May 17, 1999 (IE) .............................................. S990396

(51) Int. Cl.[7] .............................................. H05B 37/02
(52) U.S. Cl. ...................... 315/307; 315/291; 315/224
(58) Field of Search ................................ 315/307, 308, 315/306, 291, 224

(56) References Cited

U.S. PATENT DOCUMENTS

| | | | |
|---|---|---|---|
| 5,250,877 A | * 10/1993 | Fischer | 315/106 |
| 6,005,356 A | * 12/1999 | Horiuchi et al. | 315/307 |
| 6,225,755 B1 | * 5/2001 | Shen | 315/247 |
| 6,271,633 B1 | * 8/2001 | Shen et al. | 315/209 R |
| 6,411,041 B1 | * 6/2002 | Parra | 315/105 |
| 6,504,323 B2 | * 1/2003 | Yuda et al. | 315/307 |

FOREIGN PATENT DOCUMENTS

JP        07-211472        * 8/1995

* cited by examiner

*Primary Examiner*—Don Wong
*Assistant Examiner*—Ephrem Alemu

(57) ABSTRACT

A driver waveform (30) for a gas discharge lamp is produced by a ballast circuit. The waveform (30) has a substantially vertical rising portion 831) forming an instantaneous, of time 10 μsecs or so between T0 and T1, transition between currents −I1 and +I1 which are at a current value less than peak currents IP. Then in a transition rise at controlled slew rate the waveform (30) rises with a straight rising portion (32) to a steady peak current IP identified by the numeral (33). The peak current IP is maintained between T2 and T3 which accounts for between 40% and 80% of the cycle time. Then at T3 decline occurs with waveform having a declining slew rate portion (34) to time T4 when instantaneous transition between time T4 and T5 and currents +I1 to −I1 occurs. The driver waveform reduces the formation of high frequency harmonies and increases are stability.

15 Claims, 13 Drawing Sheets

ELECTRONIC BALLAST CIRCUIT

INTRODUCTION

The present invention relates to an electronic ballast circuit for gas discharge lamps and in particular, but not exclusively for public security or amenity applications.

Electronic ballast circuits have been developed to provide a steady voltage to drive gas discharge lamps or the like. However, due to the fact that the lamp is being driven at high frequencies they suffer from a number of problems, unstable arc, poor crest factor, and high frequency acoustic harmonics which may develop in the circuit, all of which considerably reduces the lifetime of the lamp and the quality of the light output. Commercially available ballasts use a fairly simple way to drive a lamp by high frequency load current through an inductor. Many in the industry are aware of the problems but heretofore there does not appear to have been any commercially available product that fully resolves this problem.

An example of such an electronic ballast is that described in PCT Patent Application No. WO 95/22194. This ballast utilises a square wave voltage waveform to drive a lamp. Such a square waveform sometimes called a driver waveform is recognised as being a particularly suitable waveform for gas discharge lamps. However, it is suggested that this ballast would not solve the above problems in particular by providing a stable arc for lamp operation and preventing high frequency acoustic harmonics.

The high frequency pulsing of a lamp is inclined to produce an unstable arc in the circuit. The arc characteristics can vary every time you switch the lamp on and off again and this happens for every AC cross-over, but at high frequency, this can happen as many as 20,000 times a second and this has a detrimental affect on the arc stability. The arc intensity can oscillate and it also has the affect of reducing the lamp lifetime.

High frequency arc resonance is a problem accepted in the industry. It is believed that having these high frequency resonances can also cause the metal welds to vibrate within the lamp, thus physical structure fatigue will occur at the welding joints. The present invention is directed towards providing an electronic ballast circuit which overcomes the problems inherent in the present methods for driving gas discharge lamps. Essentially, what is required is to provide a lamp load current waveform which will produce a stable arc, a low crest factor and minimise the introduction of high frequency acoustic harmonics.

STATEMENTS OF INVENTION

According to the invention there is provided an electronic gas discharge lamp ballast circuit of the type providing an alternating substantially square waveform characterised in that the ballast includes control means to provide a waveform having a substantially instantaneous transition phase between a current value less than peak currents with a subsequent gradual transition phase to peak current, thus providing a waveform having a substantially vertical rising portion, an upwardly inclined slew rate portion a substantially horizontal steady peak portion a declining slew rate portion and a substantially vertical falling portion followed by a mirror image negative current waveform.

The gradual transition phase may form a substantially straight waveform portion or two substantially straight interconnected waveform portions of varying rate of rise towards the peak portion and decline from the peak portion. Alternatively, the gradual transition phase forms an arcuate waveform portion which can be a sinusoidal portion.

Ideally the instantaneous phase occupies between 25% and 90% of the peak current and preferably between 70% and 80% of the peak current.

The gradual transition phase has a reducing current rate change as it approaches peak current which transition phases occupy between 20% and 60%, or ideally between 30% and 50% of the cycle time.

The invention provides a ballast circuit in which the control means comprises:
 a current value sensor;
 a signal generator; and
 a controller connected between the current value sensor and the signal generator.

The current values sensor and controller in one embodiment includes a micro-controller feeding a digital to analog converter which in turn provides a control signal to the signal generator comprising a pulse width modulator.

The invention also provides a method of driving an electronic gas discharge lamp comprising:
 providing an alternating current waveform having a peak and an instantaneous transition between a control value below both positive and negative peak;
 sensing the control value causing the current to increase to peak current at a controlled slew rate;
 sensing the peak current and maintaining the peak current constant for a preset time interval;
 at the end of the pre-set time interval causing the current to reduce from peak current to the control value at the controlled slew rate;
 sensing the control value; and
 causing the instantaneous transition.

Ideally a low frequency current is provided using high frequency circuitry comprising:
 synthesising an input power alternating current waveform using switch mode technology; and
 commutating the polarity of the resultant waveform.

Preferably the input power is controlled by using a power factor control to vary the duty cycle and to vary the pulse width of the waveform in response to lamp conditions to maintain peak current within pre-set values.

DETAILED DESCRIPTION OF THE INVENTION

The invention will be more clearly understood from the following description of some embodiments thereof, given by way of example only described with reference to the accompanying drawings in which.

Figure 2:
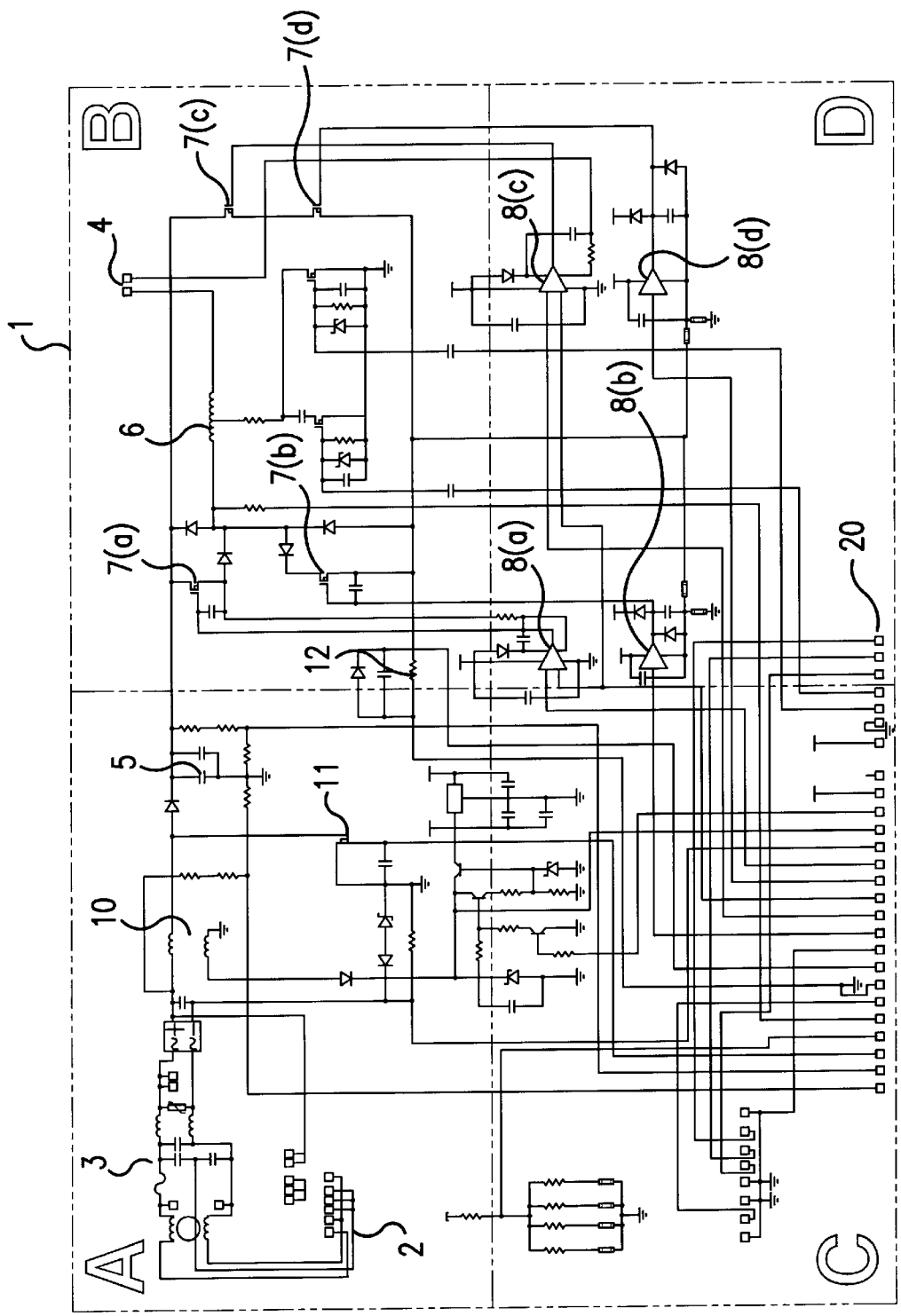
FIG. 2 is one part of a schematic representation of the electronic ballast circuit according to the invention.
Figure 2A:
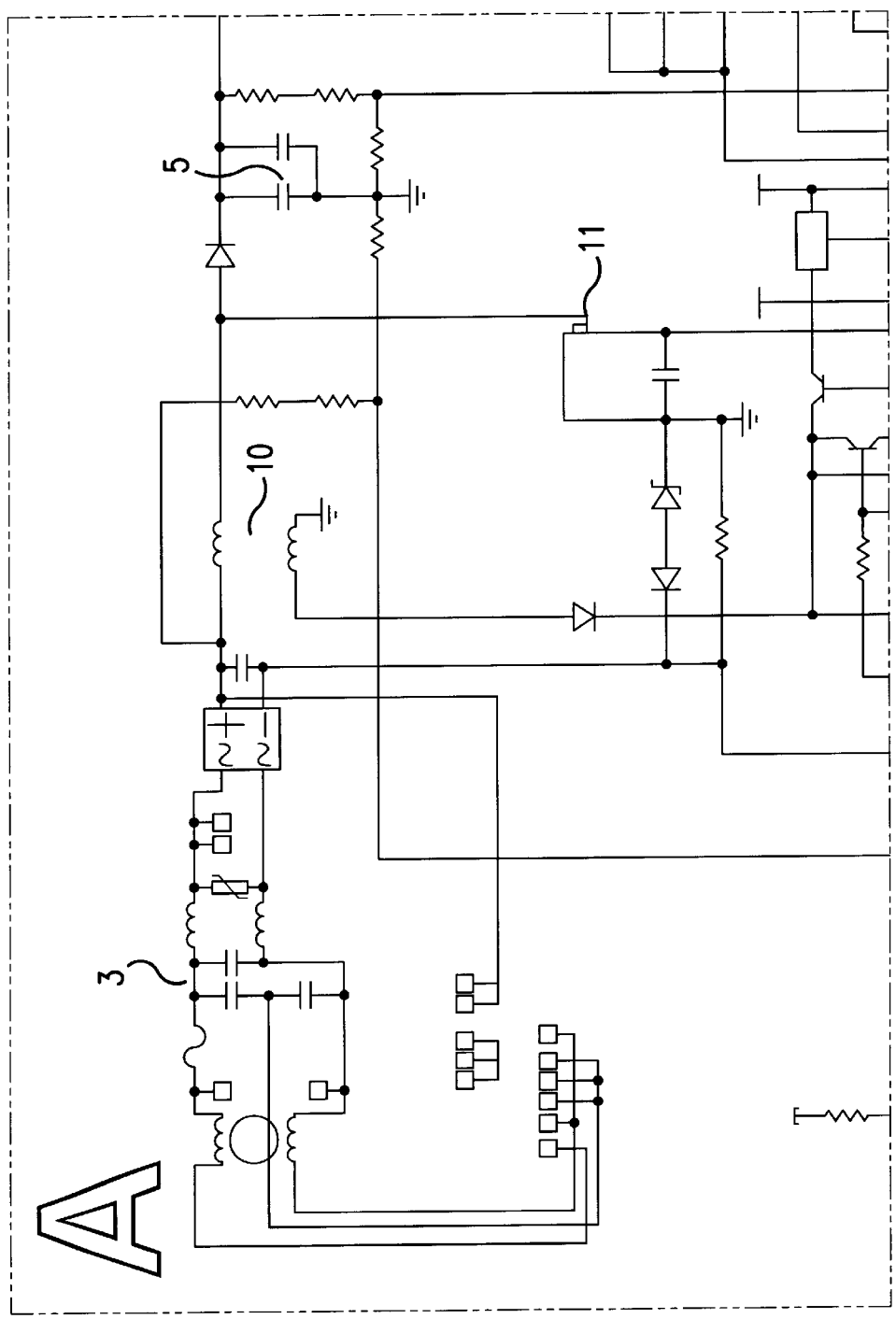
Figure 2B:
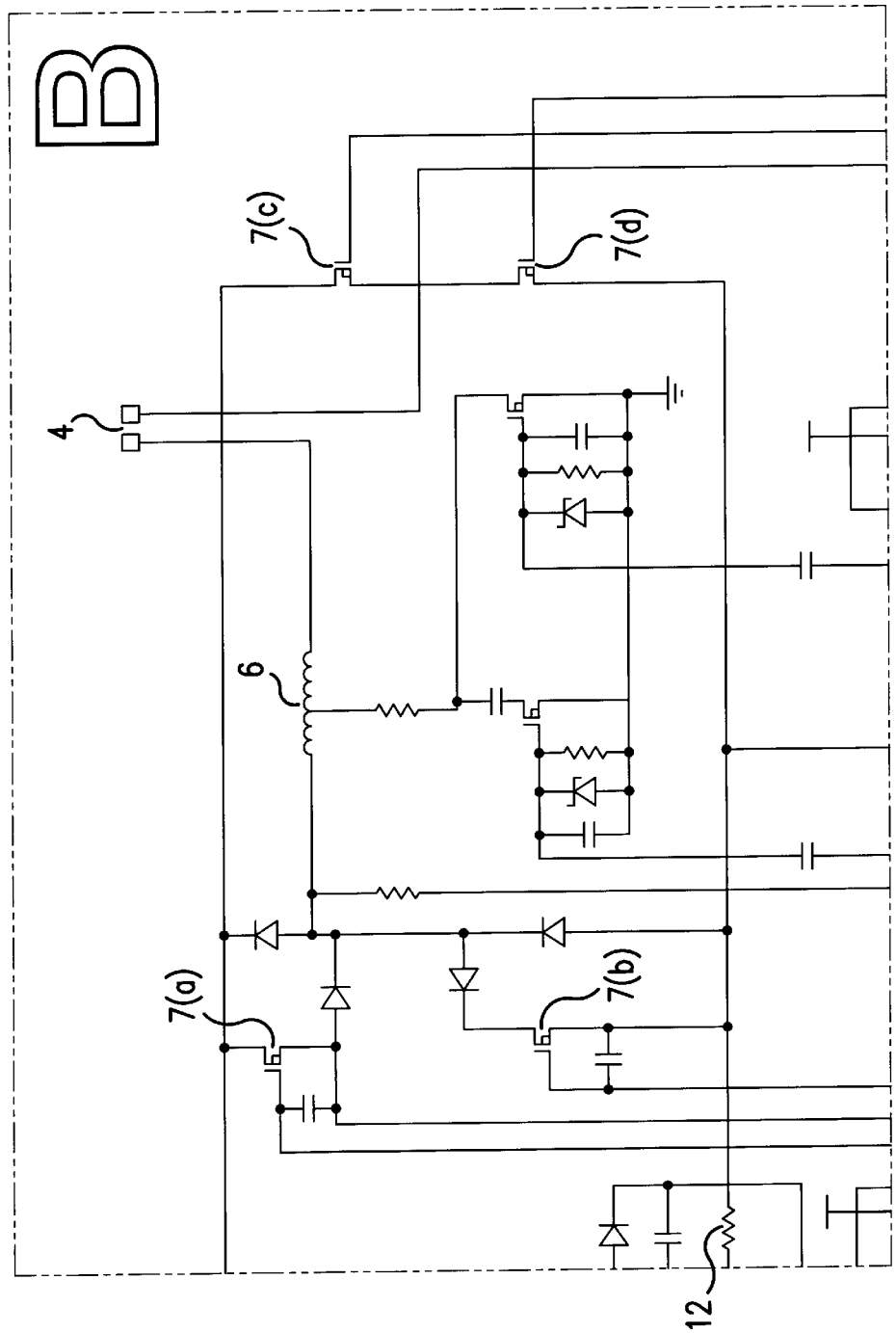
Figure 2C:
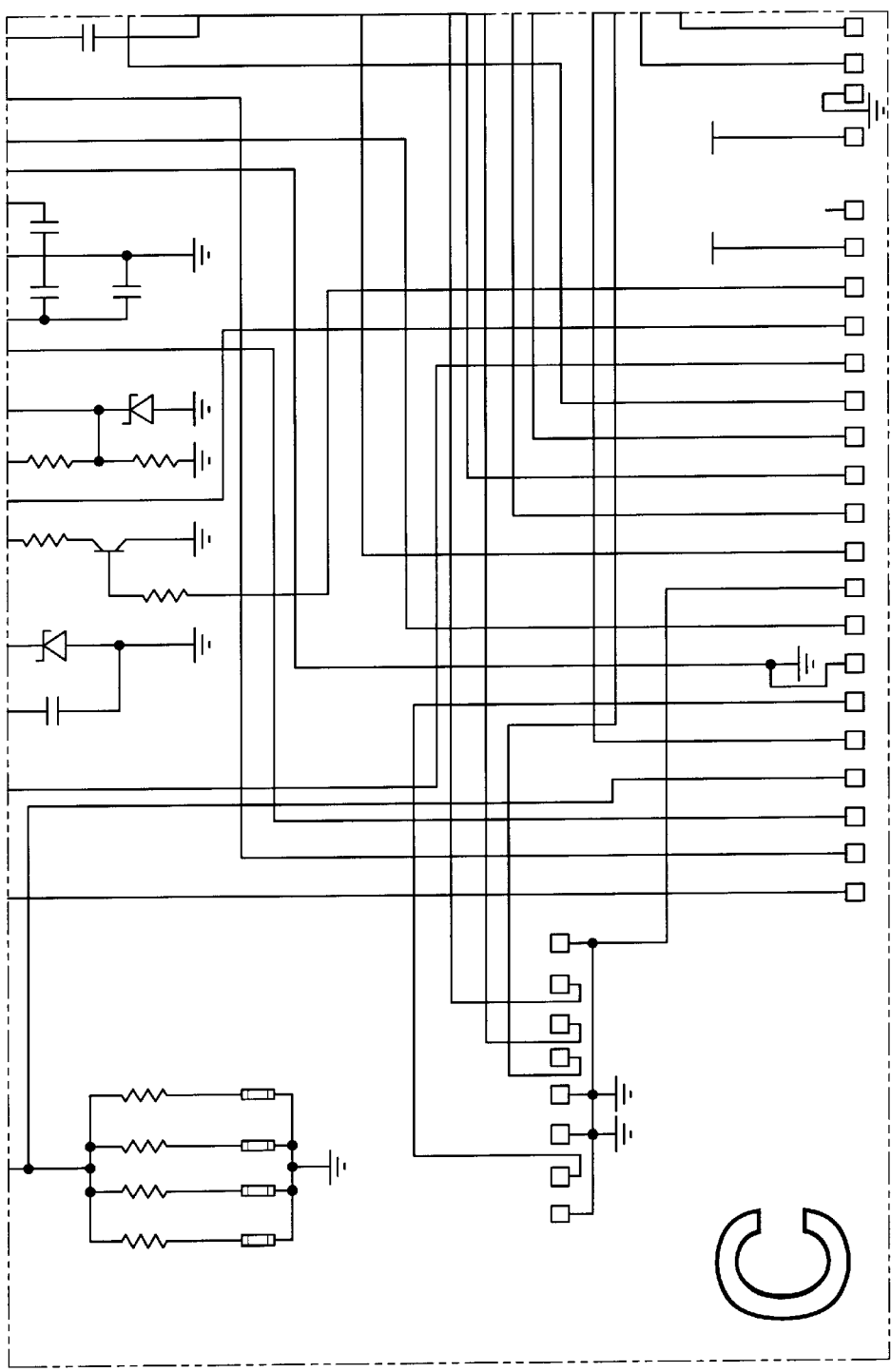
Figure 2D:
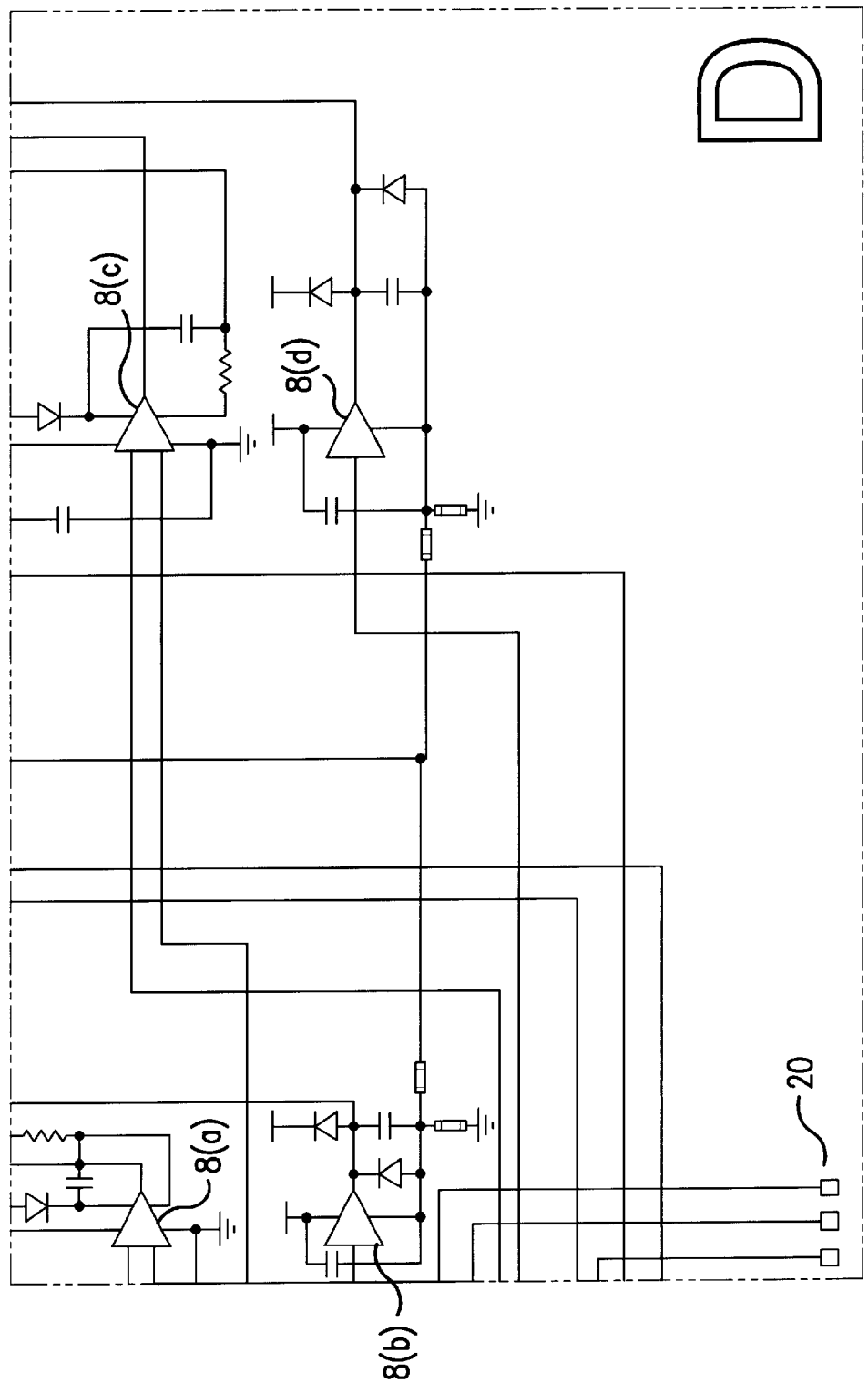
Figure 3:
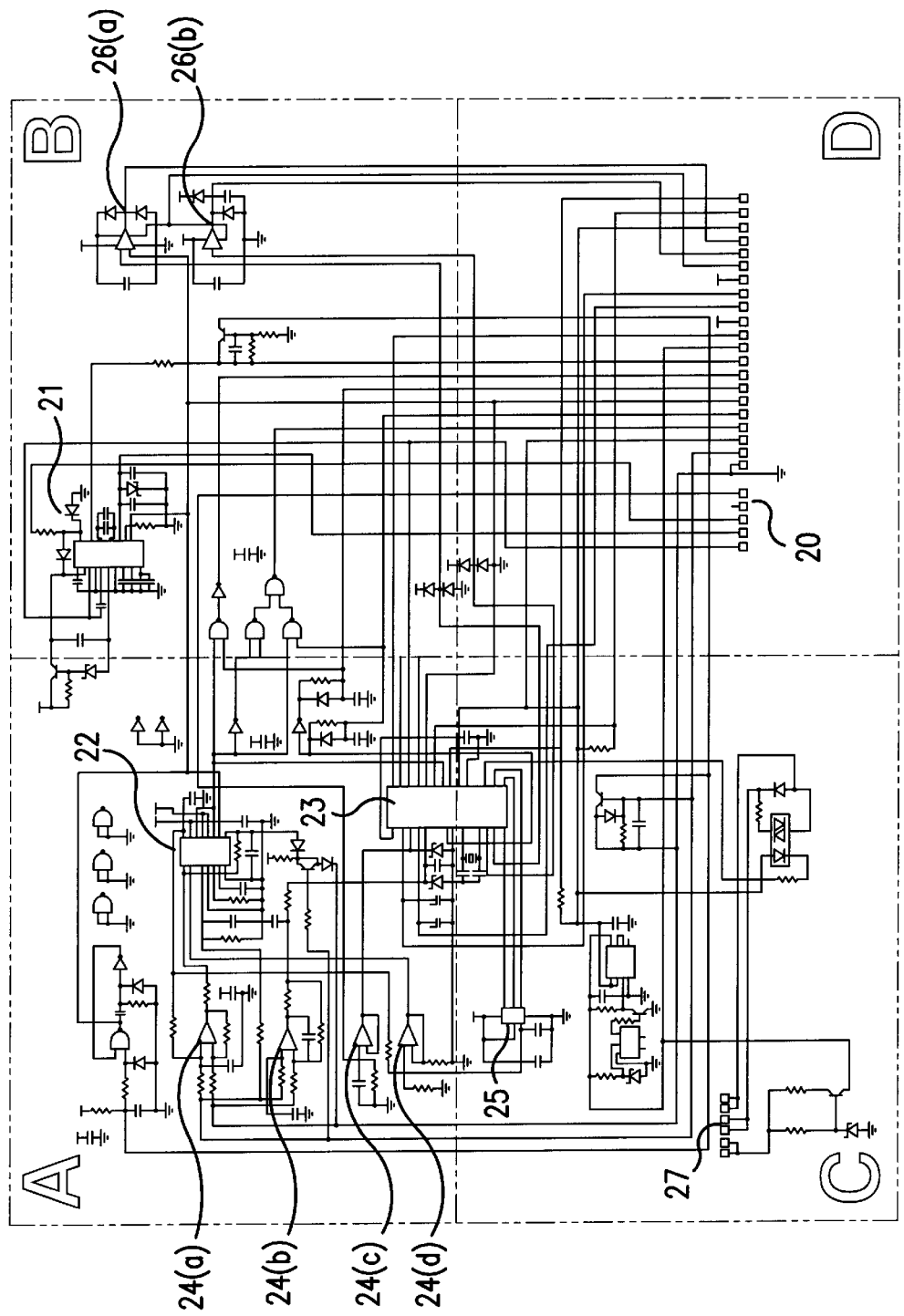
Figure 3A:
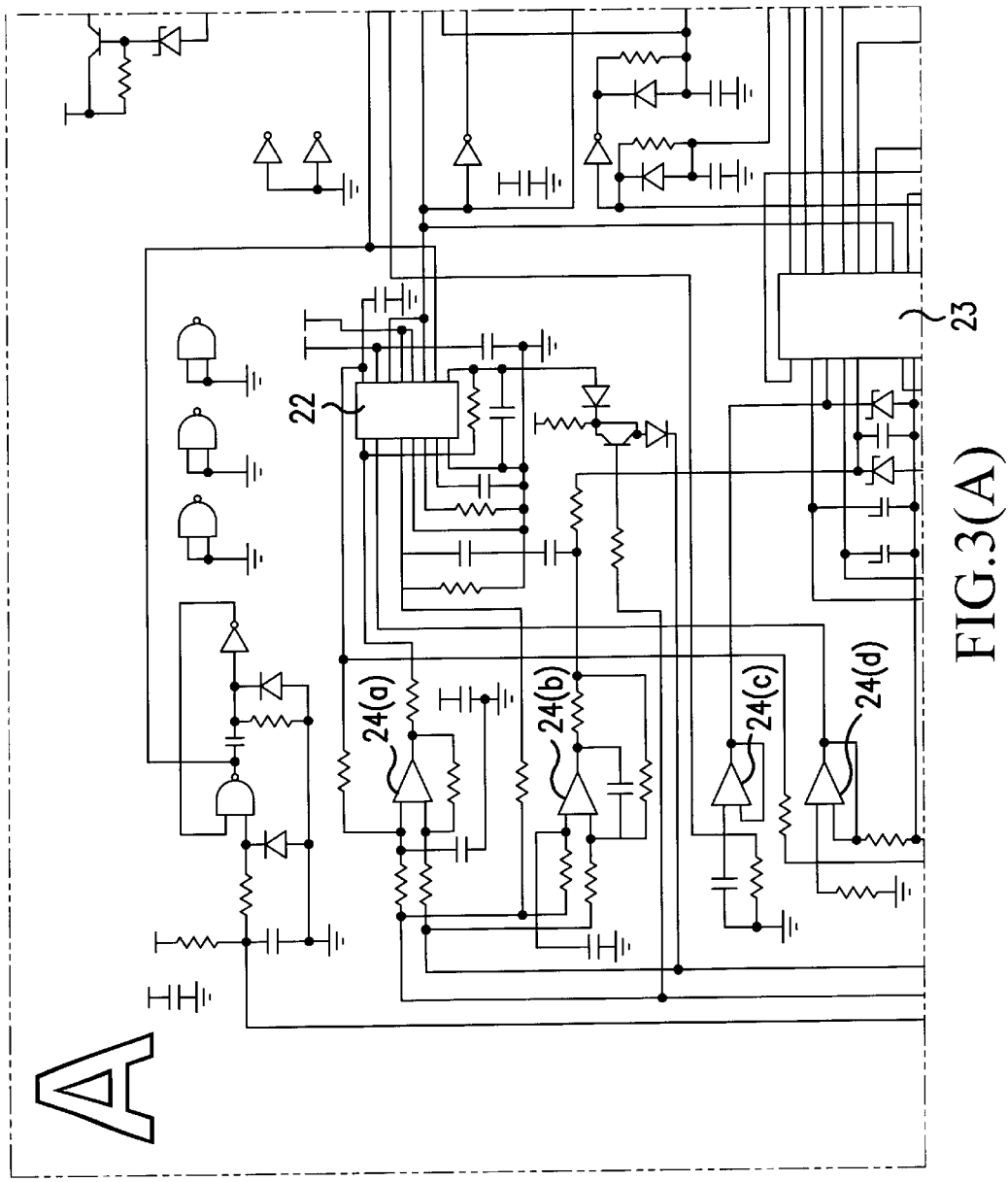
Figure 3B:
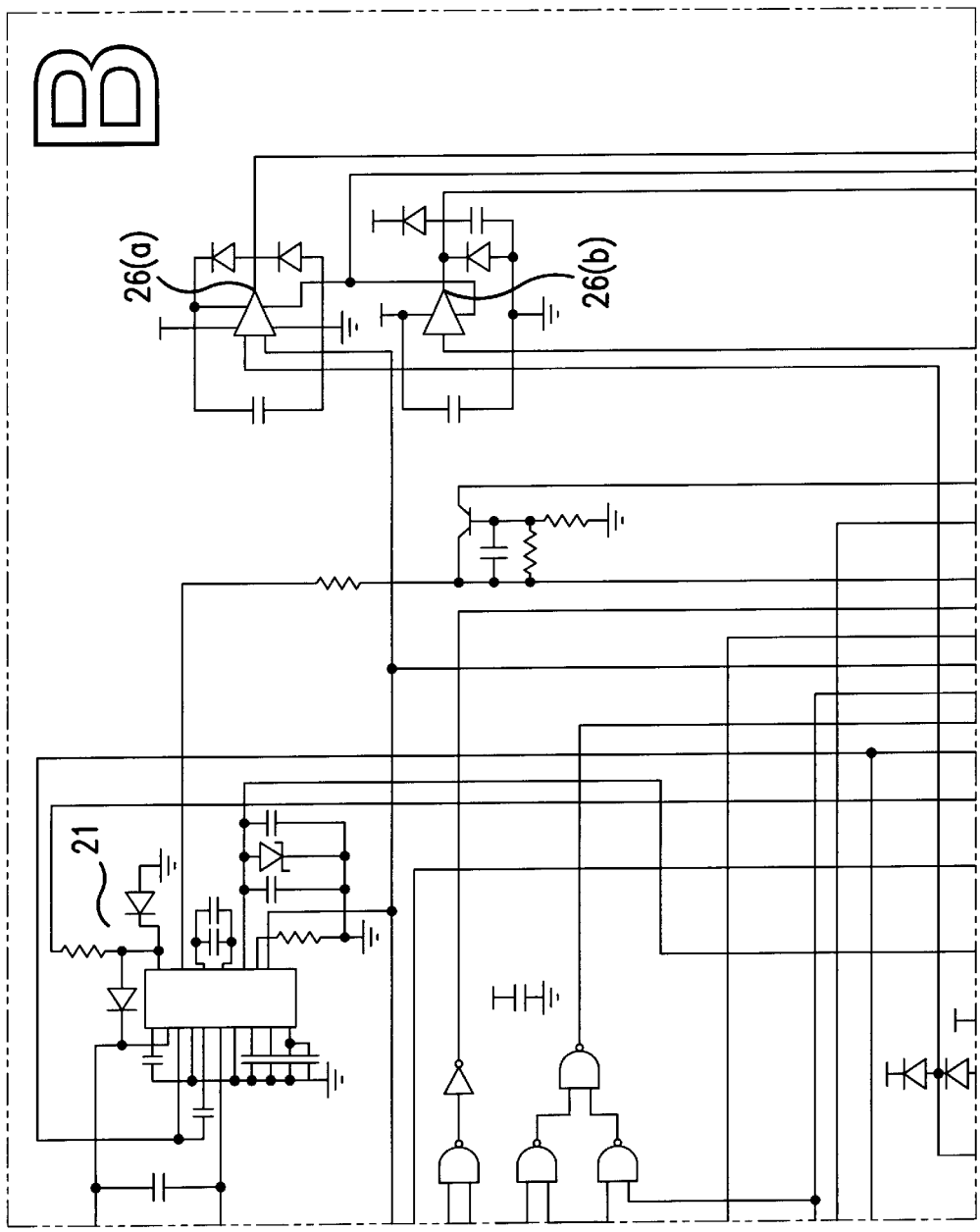
Figure 3C:
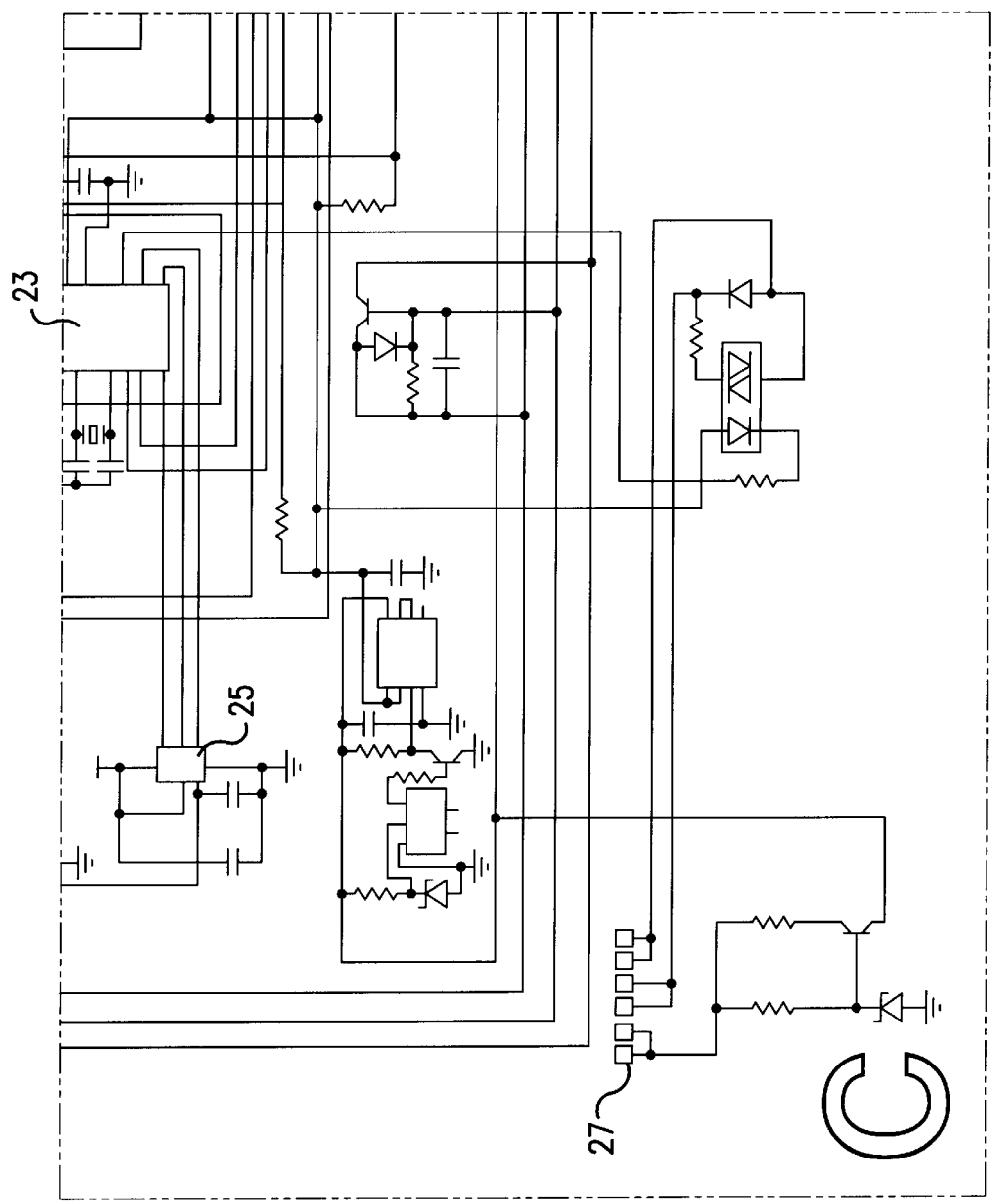
Figure 3D:
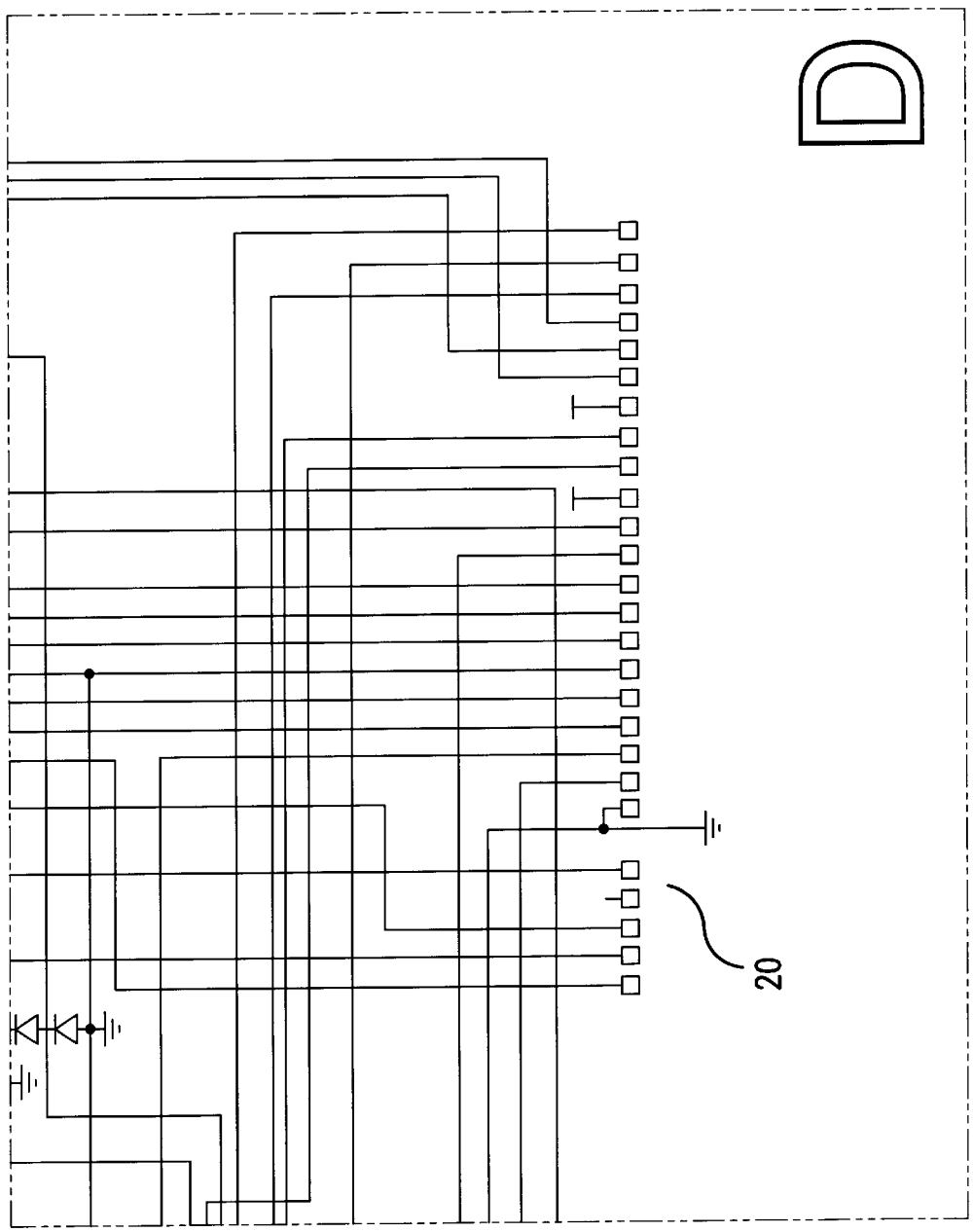

FIGS. 2(a) to 2(d) are enlargements of the similarly identified portions of FIG. 2;

FIG. 3 is the second part of the schematic representation of the electronic ballast circuit;

FIGS. 3(a) to 3(d) are enlargements of the similarly identified portions of FIG. 2; and FIGS. 4 to 7 are examples of the square waveforms for driving the lamp produced by the electronic ballast circuit.

Because the ballast circuit is comprised of a large number of conventional components such as filters, inductors, MOSFETs, etc., the ballast circuit is described by reference to its functionality and use. The operation of the various components will be readily understood by those skilled in the art. Thus, for example, to describe in detail a rectifier circuit such as the rectifier circuit 3 used in the present circuit would be pointless.

Figure 1:
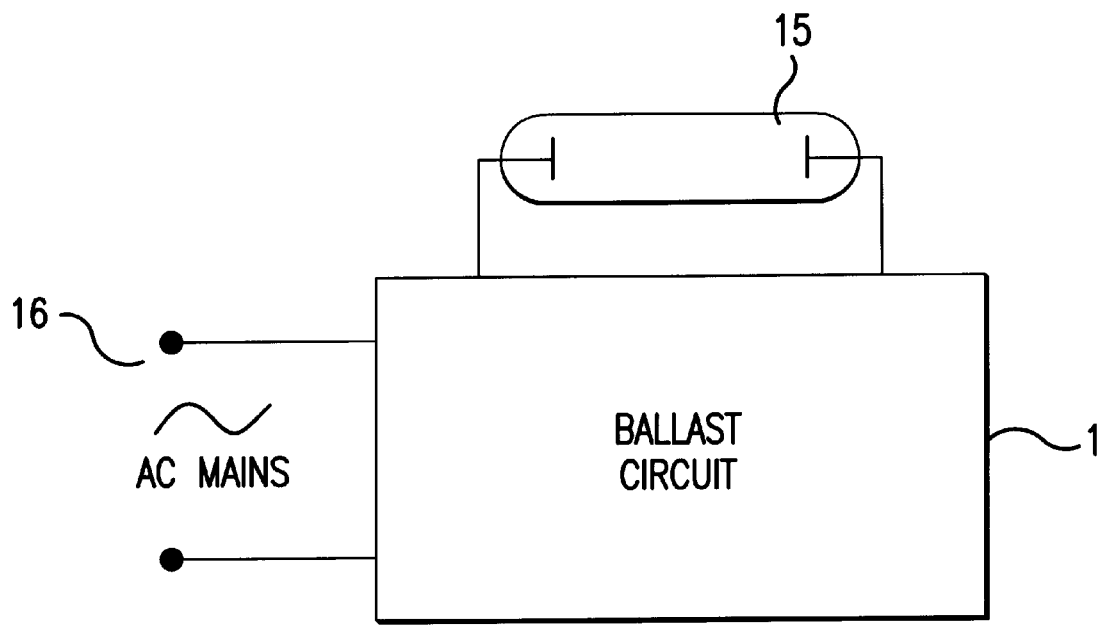
FIG. 1 is a block diagram illustrating the principal features of the invention.

Referring to FIG. 1 there is illustrated a ballast according to the invention identified by the reference numeral 1 fed from mains supply 16 driving a gas-discharge tube or lamp 15.

Referring to FIG. 2 there is illustrated part of the electronic circuit of the ballast 2. Ordinary AC mains power supply 18 is fed to contacts 2 and is full wave rectified by a rectifier 3 to provide power across contacts 4 to drive the gas discharge lamp 15 which is not shown in this drawing.

With reference to FIG. 2 there is illustrated another part of the electronic ballast control circuit 1. The circuit 1 includes a power factor controller 21 and a pulse width modulator 22 to help control the drive signals in the form of a square current form for the lamp, whose operation is controlled by a microcontroller 23. The interface between the portions of the electronic ballast control circuit 1 is identified by the reference numeral 20 in both FIGS. 2 and 3.

Referring in more detail to the circuit, the AC mains is inputted through contacts 2 and the full wave bridge rectifier 3. This is carried out by a number of filters, inductors and resistors. On the output of the full wave bridge rectifier 3 is a power factor control inductor 10 which additionally further smoothens the DC voltage, if any ripple exists. A tap is taken off the inductor 10 and works with a MOSFET 11. A connection is made to the other part of the circuit, referenced in FIG. 3, to the power factor controller 21 which ensures that the correct power factor is maintained for optimum performance of the circuit. A capacitor 5 ensures that the voltage stays constant across the contacts 4 which is connected to the gas discharge tube.

Connected to one of the contacts 4 is an inductor 6 which is connected to a load bridge which operates to drive a lamp.

The driving of the lamp and the provision of a suitable waveform is provided by MOSFETs, identified generally by the reference numeral 7(a) to 7(d). The provision of a suitable ignition of high voltage is produced by the MOSFETs 9(a) and 9(b) while amplifier circuits 8(a) to 8(d) in FIG. 2 and 26(a) and 26(b) shown in FIG. 3 are used to drive the MOSFETs.

In operation, on one cycle, MOSFETs 7(a) and 7(d) are active. The current will flow through the MOSFET 7(a), the inductor 6 to the contacts 4 and gas discharge tube and then to the MOSFET 7(d). On the reverse current, MOSFETs 7(c) and 7(b) become active and the current flows through the MOSFET 7(c) in reverse direction through the contacts 4, the gas discharge tube, the inductor 6 and the MOSFET 7(b). The MOSFETs 7(a) and 7(b) are connected through the interface 20 to the pulse width modulator 22. There is provided control means provided by the pulse width modulator 22, the micro-controller 23 and a digital analog converter (DAC) 25. In operation the pulse width modulator 22 provides the waveform to the MOSFETs 7(a) to 7(d) in a conventional manner.

Figure 4:
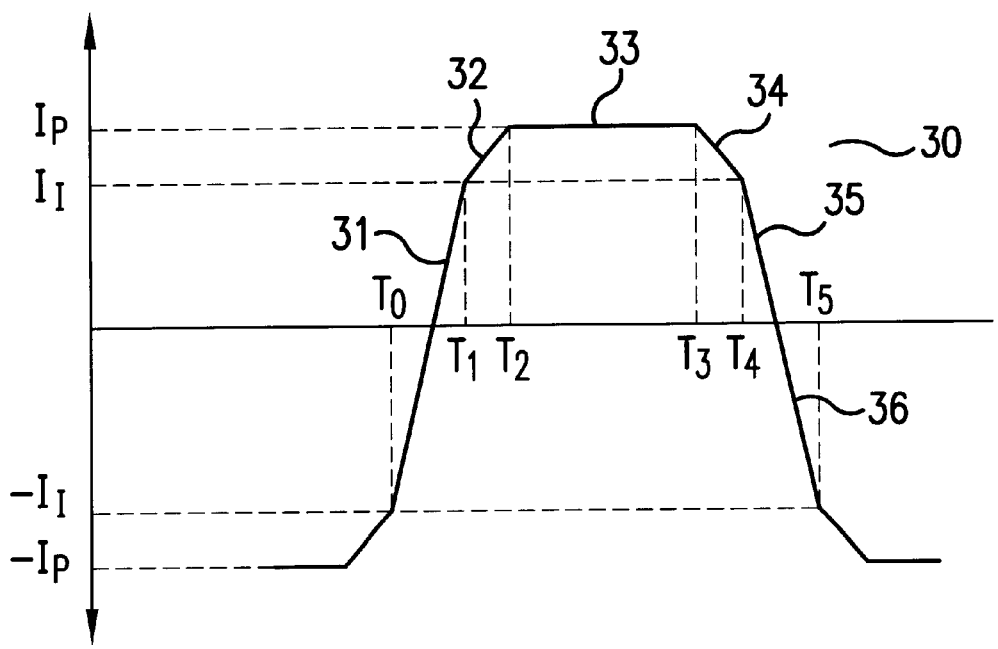

Referring to FIG. 4, at time T0 there is instantaneous rise in current to a preset control value stored in the micro-controller 23. When this control value is reached the micro-controller 23 starts incrementing the DAC 25 according to a program stored on the micro-controller 23. The slew rate is therefore controlled and ramps the current in a controlled fashion. When the current reaches peak value the micro-controller 23 stops incrementing the DAC 25 and holds it so that a constant current is obtained between time T2 and T3. At time T3 the micro-controller 23 decrements the DAC 25 so that the current level falls at the controlled slew rate until time T4 when the control value is reached.

Referring again to FIG. 4, there is illustrated the waveform of the current used to drive the gas discharge lamp 15. The shape of the waveform is slightly exaggerated for ease of understanding. In practice the vertical portion would not be as inclined as shown as it occurs over a very short period of time. The spacing between T0 and T1 and between T4 and T5 is thus much too great. Also the discussion is directed largely to the positive current waveform above the line identified generally by the reference numeral 30. This waveform and its shape is controlled by the microcontroller 23. Between time T0 and T1 there is an substantially instantaneous transition taking of the order of 10 µsecs between the currents −I1 and +I1 and this forms an instantaneous transition phase with the waveform 30 having a substantially vertical rising portion 31. From T1 to T2 the current rises gradually in a transition phase providing an upwardly inclined slew rate portion 32 to a constant peak current IP. This steady peak portion of the waveform is identified by the reference numeral 33. The current rise is at a controlled current slew rate. The peak current is maintained between T2 and T3 when it starts to decay in another gradual transition phase providing a declining slew rate portion 34 until time T4 when the current is +I1. Then between T4 and T5 another substantially instantaneous transition phase takes place between +I1 and −I1 providing the waveform 30 with a substantially vertical falling portion 35 leading into a mirror image negative waveform identified generally by the reference numeral 36.

The abrupt sharp transition between −I1 and +I1 and obviously between +I1 and −I1 minimises the time for which the arc is extinguished. This thus increases considerably the probability that the new arc will form under identical or very similar conditions to that which pertained on forming the original arc. This contributes to the stability of the lamp. From the abrupt transition the controlled rise over time to peak current and then the controlled decay over time provides a suitable slew rate which obviates the possibility of acoustic harmonics being introduced which will cause the lamp mechanical assembly to "ring". It is believed that this ringing can cause fatigue of the welds and cause premature failure of the lamp. The gentle slew rate reduces the amplitude of the acoustic harmonics. Finally, by providing a flat top waveform crest factor (the ratio of the peak value to the RMS value) is minimised.

Referring again to FIG. 2, there are four operational amplifiers 24(a), (b), (c), (d) with 24(a) measuring the current across the contacts 4 that is feeding into the pulse width modulator 22. The second operational amplifier 24(b) is giving an indication of that voltage by a filtered version of it to the microcontroller 23. The next operational amplifier 24(c) operates with a resistor 13 in such a way that it feeds back the voltage across the contacts 4 to the operational amplifier 24(c) that feeds into the microcontroller 23. The last operational amplifier 24(d) operates with a digital to analog converter (DAC) 25. The microcontroller 23 indicates to the DAC 25 that it wants a particular power out, the DAC 25 generates the voltage, sent through the operational amplifier 24(d) and then to the pulse width modulator 22 so that it controls the process to get the correct power to the contacts 4 and hence the gas discharge lamp 15.

As the gas discharge lamp 15 operates, due to wear and tear over time the voltage across the contacts 4 rises. In a typical gas discharge tube or lamp, it may start at 80 volts and keep rising until it reaches 130 volts or even higher when cycling occurs. The lamp switches on and switches off over time which can vary from milliseconds to minutes. In the present circuit this is prevented because the circuit can actually measure the voltage rise. Eventually there arrives a stage when the circuit could no longer drive the lamp, but the microcontroller 23 can switch it off before it gets to that stage. However, the voltage monitoring circuit can also indicate that the voltage has risen above a predetermined level such as to indicate that the lamp has got close to the end of its useful life.

For a lamp to operate correctly, it is necessary that the ignition of the lamp be controlled in a suitable manner. In order for the lamps to be ignited they need a high voltage spike of several kilovolts. The present circuit provides a voltage spike of the order of 5 kilovolts for a brief period. This is achieved by using ignition MOSFETs 9(*a*) and 9(*b*). When, for example, the MOSFET 9(*b*) switches off the voltage fed to inductor 6 to provide an output pulse rises so that at one of the contacts 4 a voltage spike of the order of 5 kilovolts is obtained. Once the lamp ignites then the inductor 6 controls the current going to the lamp so that it acts as a current limiter. Therefore the one inductor 6 carries out two tasks in the circuit.

Another feature of the present invention is that a low frequency current waveform delivered to the lamp is provided by the ballast 1 which uses high frequency circuitry. This is achieved by commutating the MOSFETs 7(*c*) and 7(*d*) to change the polarity of the waveform. The ballast 1 has the ability of monitoring the lamp voltage by regulating the power factor control voltage. Power to the lamp is kept constant by varying the pulse width from the pulse width modulator. This is achieved by varying the duty cycle via the MOSFET 11 to ensure constant power to the lamp. MOSFETs 7(*a*) and 7(*b*) can be used to compensate for any drop in lamp current which can vary the width of the duty cycle. This method has the further advantage that control of the lamp is independent of the mains.

On a fault occurring the microcontroller 23 can cause a signal to be delivered to the contacts 27 which contacts 27 can be then be used to either direct a signal to a central host station to indicate the fault or to cause a visible signaling device to be operated such as described in our co-pending PCT Patent Application PCT/IE99/00044 filed the same day as Irish application No. 99 0396 on which this application is based and the disclosure of which is incorporated herein by reference.

The use of the microcontroller 23 allows the waveform of the current to be formed in the desired shape and it will be appreciated that if other waveforms or variations on this waveform are found to be necessary for a particular construction of gas discharge tube that it can be relatively easily supplied.

Figure 5:
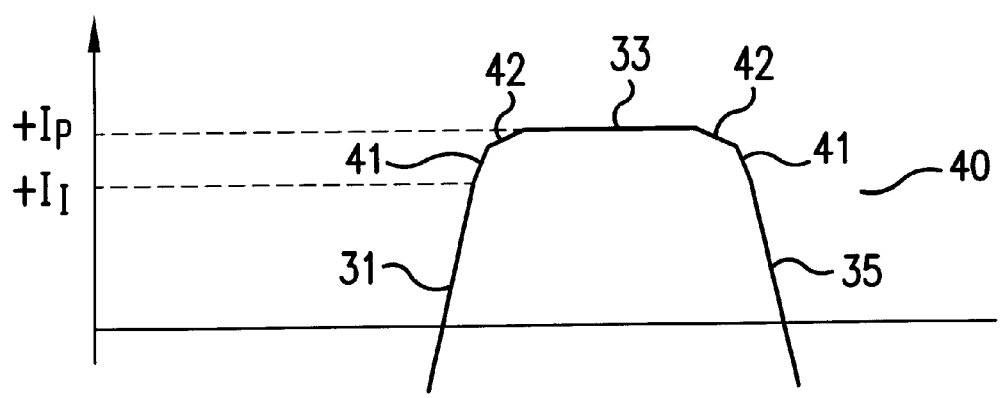

FIG. 5 illustrates a waveform indicated generally by the reference numeral 40 in which those parts of the waveform 40 identical to those of the waveform 30 are identified by the same reference numerals. In this embodiment, the gradual transition phase forms two substantially interconnected waveform portions 41 and 42 of varying rate of rise to and decline from the peak.

Figure 6:
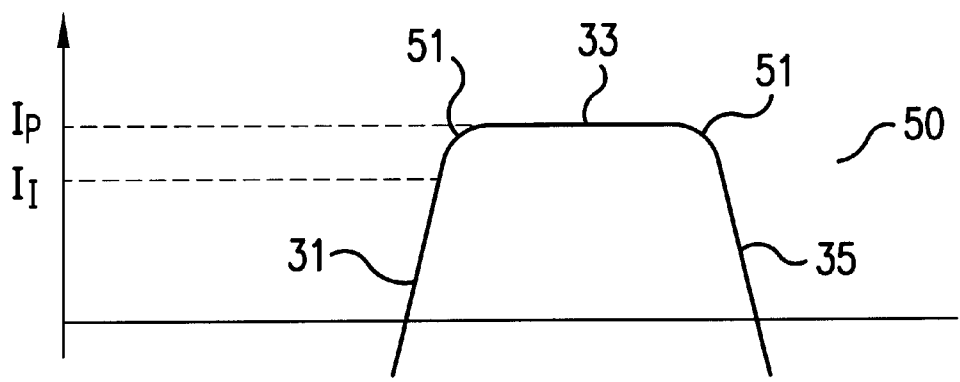

Referring now to FIG. 6 there is illustrated a still further waveform indicated generally by the reference numeral 50 in which parts similar to of the waveform 30 are identified by the same reference numerals. In this embodiment the gradual transition phase forms an arcuate waveform portion 51 of substantially part sinusoidal shape.

Figure 7:
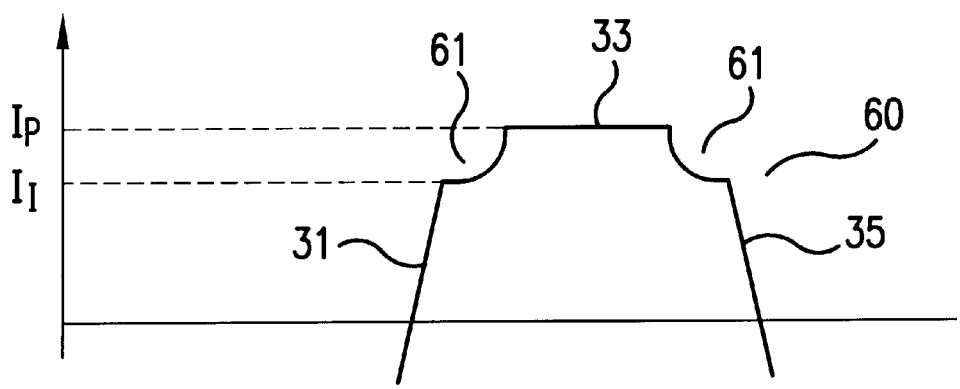

FIG. 7 illustrates another waveform indicated generally by the reference numeral 60 and again in which parts similar to those described with reference to the previous drawings are identified by the same reference numerals. This waveform again has a gradual transition phase which forms an arcuate waveform portion 61.

The pulse width modulator and the DAC could be incorporated into a digital and/or software implementation of their function.

While the above embodiment shows a particularly suitable way of providing the necessary driver waveform, it will be appreciated by those skilled in the art that many other ways could be used to provide the waveform. The essence of the invention is in the modification or alteration of the conventional waveform in the manner shown and not in the manner in which it is achieved. The present arrangement is particularly advantageous in that it is a simple cost effective and efficient way of doing it. However, what must be appreciated is that a major aspect of the present invention is the recognition of the need to control the waveform accurately to provide better than existing lamp operating conditions. The important feature of the present invention is that it achieves both a quick zero cross transition to minimise the time for which the arc is extinguished while at the same time compensating for the introduction of acoustic harmonics. It is also accepted that experimentation may find that different shapes of waveform may be provided and that the percentage rise in current instantaneously can vary depending on particular operating conditions and in for particular constructions of gas discharge tube or lamp. Thus, it is envisaged that the instantaneous rise in current can be between 25% and 90% of the peak current. We have found that somewhere between 70% and 80% is ideal but this may be due more to the particular gas discharge tubes that have been used in tests to date than for any other reason. Similarly, it has been found that the controlled rise and decay takes place over between 20% and 60% of the cycle time. That is to say, for example, the rise takes place over between 10% and 30% of the cycle time, however, it is suggested that this may be more likely to be somewhat of the order of 15 to 25% but again sufficient work has not been done to date to accurately assess what are either the correct levels of current that should be achieved instantaneously nor indeed the length of time under which the rise and decay between peak and that level of current, that is to say the instantaneous current achieved should be arranged.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiment hereinbefore described, but may be varied in both construction and detail within the scope of the claims.

What is claimed is:

1. An electronic gas discharge lamp ballast circuit of the type comprising a control means (22, 23, 25) providing an alternating substantially square current waveform (30) for the electronic gas discharge lamp having a substantially vertical portion (31) providing a substantially instantaneous transition phase and a substantially horizontal peak portion (33) characterized in that the control means (22, 23, 25) comprises:

a current value sensor (23) to sense when the vertical portion (31) reaches a pre-set control value; and a microcontroller connected to a digital analogue converter (DAC) to provide at the pre-set value an inclined rising slew portion (32) to form a gradual transition phase between the instantaneous phase and the horizontal peak portion (33) and then toward the end of the half-cycle to provide an inclined falling slew portion (34) from the horizontal peak portion (33) to the pre-set level and in the next half-cycle to cause the microcontroller connected to a digital analogue converter (DAC) to form a mirror image negative current waveform (36).

2. A ballast circuit as claimed in claim 1 in which the gradual transition phase forms a substantially straight waveform portion (32, 34).

3. A ballast circuit as claimed in claim 1 in which the gradual transition phase forms two substantially straight interconnected waveform portions (41, 42) of varying rate of rise towards the peak portion (33) and decline from the peak portion (33).

4. A ballast circuit as claimed in claim 1 in which the gradual transition phase (60) forms an arcuate waveform portion (61).

5. A ballast circuit as claimed in claim 4 in which the waveform portion is a sinusoidal portion (51).

6. A ballast circuit as claimed in claim 1 in which the instantaneous phase occupies between 25% and 90% of the peak current.

7. A ballast circuit as claimed in claim 1 in which the instantaneous phase occupies between 70% and 80% of the peak current.

8. A ballast circuit as claimed in claim 1 in which the gradual transition phase has a reducing current rate change as it approaches peak current.

9. A ballast circuit as claimed in claim 1 in which the transition phases occupy between 20% and 60% of the cycle time.

10. A ballast circuit as claimed in claim 1 in which the transition phases occupy between 30% and 50% of the cycle time.

11. A ballast circuit as claimed in claim 1 in which the control means comprises:
   a signal generator for controlling drive signals to the electronic gas discharge lamp; and
   a controller connected between the current valve sensor and the signal generator.

12. A ballast circuit as claimed in claim 11 in which the current value sensor and controller includes a microcontroller (23) feeding a digital to analog converter (25) which in turn provides a control signal to the signal generator comprising a pulse width modulator (22).

13. A method of driving an electronic gas discharge lamp comprising:
   providing an alternating substantially trapezoidal current waveform for the electronic gas discharge lamp having a substantially horizontal peak and a substantially vertical portion providing an instantaneous transition between a control value below both positive and negative peak;
   sensing the control value;
   causing the current to increase to peak current at a controlled slew rate;
   sensing the peak current and maintaining the peak current constant for a pre-set time interval
   at the end of the pre-set time interval causing the current to reduce from peak current to the control value at the controlled slew rate;
   sensing the control value; and
   causing the instantaneous transition to provide a resultant waveform.

14. A method as claimed in claim 13 in which a low frequency current is provided using high frequency circuitry comprising:
   synthesising an input power alternating current waveform using switch mode technology; and
   commutating the polarity of the resultant waveform.

15. A method as claimed in claim 13 in which the input power is controlled by using a power factor control to vary the duty cycle of the lamp and to vary the pulse width of the waveform provided by a pulse width modulator in response to lamp conditions to maintain peak current within pre-set values.

* * * * *